June 25, 1935. E. C. HORTON 2,006,322
WINDSHIELD CLEANER BLADE
Filed July 20, 1932
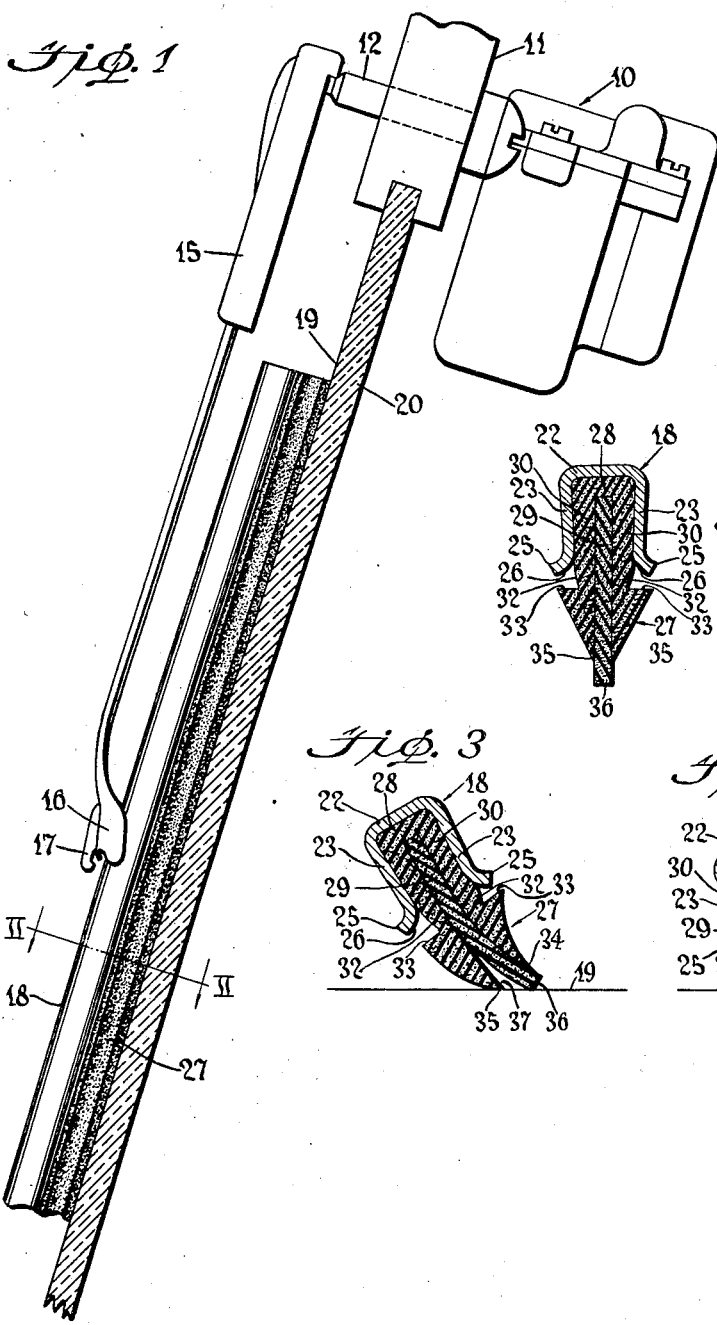
Inventor
*Erwin C. Horton*
By *Bean & Brooks* Attorneys Patented June 25, 1935

2,006,322

UNITED STATES PATENT OFFICE 2,006,322

WINDSHIELD CLEANER BLADE

Erwin C. Horton, Hamburg, N. Y., assignor to Trico Products Corporation, Buffalo, N. Y.

Application July 20, 1932, Serial No. 623,625

3 Claims. (Cl. 15—245)

This invention relates to windshield cleaners and it has particular relation to windshield cleaner blades for wiping the surfaces of vehicle windshields.

One object of the invention is to provide a unitary yieldable wiping element adapted to engage a relatively large surface of the windshield and at the same time provide the advantages of a laminated structure.

Another object of the invention is to provide a laminated windshield wiper in which one of the yieldable wiping strip material members constitutes a holder for other strip material members of the wiper before it is mounted in a rigid blade holder.

Another object of the invention is to provide a laminated windshield wiper having maximum surface contact, together with laminations for expelling or dispensing with moisture drawn between the laminations as they separate in one direction of movement in their wiping operation.

Referring to the drawing:

Fig. 1 is a side elevation of a windshield wiper attached to a windshield supporting frame of a vehicle;

Fig. 2 is a cross-section of a wiper blade, on a larger scale, taken substantially along the line II—II of Fig. 1 and omitting the windshield;

Fig. 3 is a cross-section similar to Fig. 2 and illustrating the position of the blade during its operation under relatively slight pressure against the windshield; and Fig. 4 is a cross section illustrating the position of the blade during its operation under relatively heavy pressure against the windshield.

In practicing the invention a windshield cleaner motor 10 is mounted upon a portion of the vehicle frame or header bar 11 and is provided with a shaft 12 extending through the frame to the outside of the vehicle. A wiper arm 15 at one of its ends is non-rotatably mounted upon the outer end of the shaft 12 and the other end of the arm has a flanged and slotted head 16 for connection to a clip 17 of a wiper blade 18. The clip and blade are assembled in rigid relation and the flanged head 16 fits loosely over the sides of the blade in order to provide for opposite tilting action of the blade when the motor oscillates the arm 15 to move the blade 18 across the surface 19 of a windshield 20 mounted in the vehicle.

The blade 18 comprises a rigid holder or back 22 in the form of a channel substantially U-shaped in cross-section and having its channel sides or legs 23 turned outwardly to form lateral marginal flanges 25 having outwardly rounded inner surfaces 26. A laminated rubber wiping strip 27 is fitted into the channel holder 22 and is composed of a channel strip 28 and an intermediate plain or flat strip 29 inserted in the channel of the strip 22. In order to insure proper shape and convenience in manufacture, the channel 28 is extruded in substantially the form shown in the drawing and is then cured in a properly shaped mold.

Intermediate side portions of the channel legs 30 of the rubber channel strip 28 are provided with narrower portions 32 which form junctions with oppositely disposed shoulders 33 extending laterally from the sides of the rubber channel strip. The outer marginal portions of the channel strips are tapered toward their outer extremities from the extremities of the shoulders 33 into the form of feather edges. It is desirable that the intermediate strip 29 be composed of a fine grade of calendered rubber and its outer fine pliable edge 36 projects beyond the feather edge extremities of the channel strips. In fact, as shown in Fig. 2, the edges substantially converge into the surfaces of the strip 29 from opposite direction.

In operating the blade by oscillating it across the windshield surface 19 the edge 35 separates from the extremity 36 of the intermediate strip and thus creates a suction for drawing moisture into a crevice 37 when the blade moves in a tilted position against the windshield. This suction is not sustained because the ends of the blade are not sealed, but the momentary suction created by separating two contacting surfaces is sufficient to draw moisture between them. When the blade is tilted and pressed against the windshield, as shown in Fig. 4, there is ample area of wiping contact extending from the extremity of the shoulder 33 to the end 36 of the intermediate strip. However, there is still a slight break in the surfaces in the form of the crevice 37 into which moisture is drawn. Upon reversal of the wiper blade the crevice is closed to expel the moisture and a like crevice is formed upon the opposite side of the wiper. In oscillating the blade the narrow portion 32 adjacent the shoulder 33 on each side of the rubber channel strip 28 rolls against the outwardly rounded inner surface 32 of the lateral flange 25.

Since the laminated rubber wiper strip 27 is composed of only two members, one of which is in channel form for receiving the other, it can be assembled and handled as a unit before it is inserted into the rigid channel holder 22 and also in conjunction with its insertion into this channel holder. Thus, the double advantages of unitary structure, and laminations having different characteristics, are included in one element. The narrow portions 32 of the channel side provide a flexing zone between the shoulders 33 and the lateral flanges 25 of the back, and the entire surface, from the edge of one of the shoulders 32 to the feather edge 35 is adapted to be in wiping contact with the surface of the windshield in the respective directions of oscillation.

Although only one form of the invention has been shown and described in detail, it will be apparent to those skilled in the art that the invention is not so limited, but that various changes may be made therein without departing from the spirit of the invention or from the scope of the appended claims.

What is claimed is:

1. A wiper blade comprising a channelled holder, and a laminated yieldable wiper element mounted in the channelled holder, the outer laminated portions of the wiper element having outwardly extending shoulders adjacent the holder edges, the outer sides of the outer laminations tapering from the shoulders outwardly in normally converging planes into the form of feather edges, the inner laminated portion of the wiper element projecting from the tapered edges and cooperating therewith to provide wiping surfaces.

2. A wiper blade comprising a rigid holder having side flanges and a bight portion forming a rigid channelled structure, said side flanges having outwardly rounded marginal portions, a resilient wiper member having side flanges and a bight portion forming a resilient channelled structure, said wiper member being internested in the channelled rigid member, resilient strip wiper material fitting into the channelled resilient wiper member, one edge of the resilient strip material projecting outwardly from between the flanges of the resilient channelled structure, a lateral shoulder formed upon the outer side of each resilient channel flange adjacent the outwardly rounded marginal portions of the rigid channel flanges, the flanges of the resilient channelled member being narrowed adjacent the bases of the shoulders thereof and constituting bearing surfaces for rolling action against the outwardly rounded marginal portions of the rigid channel flanges.

3. A wiper blade comprising a channelled holder, a wiper member including a plurality of yieldable wiper strip portions arranged in laminated form and mounted in the channelled holder, the outer sides of said wiper member having shoulders projecting laterally in opposite directions, said shoulders being spaced from the edges of the channelled holder, marginal areas of the shouldered strip portions being tapered from the location of the shoulders toward the edge extremities of the strip portions to form wiping side areas converging into feather edges.

ERWIN C. HORTON.